United States Patent
Erez et al.

(10) Patent No.: US 10,055,236 B2
(45) Date of Patent: Aug. 21, 2018

(54) RUNTIME DATA STORAGE AND/OR RETRIEVAL

(71) Applicant: SANDISK TECHNOLOGIES LLC, Plano, TX (US)

(72) Inventors: Eran Erez, Bothell, WA (US); Judah Gamliel Hahn, Ofra (IL)

(73) Assignee: SanDisk Technologies LLC, Addison, TX (US)

( * ) Notice: Subject to any disclaimer, the term of this patent is extended or adjusted under 35 U.S.C. 154(b) by 0 days.

(21) Appl. No.: 14/791,048

(22) Filed: Jul. 2, 2015

(65) Prior Publication Data
US 2017/0003981 A1 Jan. 5, 2017

(51) Int. Cl.
G06F 9/44 (2018.01)
G06F 9/4401 (2018.01)
G06F 3/06 (2006.01)
G06F 1/32 (2006.01)

(52) U.S. Cl.
CPC .......... G06F 9/4418 (2013.01); G06F 1/3268 (2013.01); G06F 3/0625 (2013.01); G06F 3/0632 (2013.01); G06F 3/0656 (2013.01); G06F 3/0679 (2013.01); G06F 9/4406 (2013.01); Y02B 60/1246 (2013.01); Y02D 10/154 (2018.01)

(58) Field of Classification Search
CPC .... G06F 9/4418; G06F 9/4413; G06F 9/4411; G06F 9/4406
See application file for complete search history.

(56) References Cited

U.S. PATENT DOCUMENTS

| | | | |
|---|---|---|---|
| 5,542,082 A * | 7/1996 | Solhjell | G05B 19/0426 710/13 |
| 5,630,093 A | 5/1997 | Holzhammer et al. | |
| 5,802,069 A | 9/1998 | Coulson | |
| 6,195,749 B1 * | 2/2001 | Gulick | G06F 9/4401 713/1 |
| 6,286,057 B1 | 9/2001 | Cornaby et al. | |
| 6,374,353 B1 * | 4/2002 | Settsu | G06F 9/4406 713/2 |
| 6,434,697 B1 * | 8/2002 | Leyda | G06F 9/4401 713/2 |
| 6,539,456 B2 * | 3/2003 | Stewart | G06F 9/4401 711/113 |
| 6,654,880 B1 | 11/2003 | Yamamoto | |
| 7,024,571 B1 * | 4/2006 | Reger | G06F 9/4406 713/100 |
| 7,058,829 B2 * | 6/2006 | Hamilton | G06F 1/3203 713/300 |
| 7,080,232 B2 | 7/2006 | Aasheim et al. | |
| 7,089,424 B1 | 8/2006 | Subbiah | |

(Continued)

*Primary Examiner* — Midys Rojas
*Assistant Examiner* — Khoa D Doan
(74) *Attorney, Agent, or Firm* — Michael Best & Friedrich LLP

(57) ABSTRACT

A data storage device includes a memory and a controller. The controller is configured to, in response to a transition from a low power state to an active state, load runtime data to a volatile memory of the controller from a memory of a device coupled to the controller via an interface and, concurrently with loading the runtime data from the memory of the device to the volatile memory of the controller, load other data from the non-volatile memory to the volatile memory of the controller.

27 Claims, 8 Drawing Sheets

(56) References Cited

U.S. PATENT DOCUMENTS

| | | | |
|---|---|---|---|
| 8,082,433 B1* | 12/2011 | Fallone | G06F 9/4401 365/215 |
| 8,862,822 B2* | 10/2014 | Koga | G06F 11/3485 711/115 |
| 8,909,889 B1* | 12/2014 | Ong | G06F 3/0601 360/73.01 |
| 8,966,176 B2 | 2/2015 | Duzly et al. | |
| 9,361,250 B2* | 6/2016 | Shan | G06F 13/1694 |
| 2002/0069354 A1* | 6/2002 | Fallon | G06F 3/0613 713/2 |
| 2002/0184437 A1* | 12/2002 | Simmons | G11C 7/1075 711/105 |
| 2003/0074535 A1* | 4/2003 | Owhadi | G06F 11/1441 711/162 |
| 2003/0084235 A1* | 5/2003 | Mizuki | G11C 11/406 711/105 |
| 2004/0003223 A1* | 1/2004 | Fortin | G06F 1/3203 713/1 |
| 2004/0010681 A1* | 1/2004 | Lee | G06F 17/30067 713/2 |
| 2004/0064647 A1* | 4/2004 | Dewhitt | G06F 1/3203 711/135 |
| 2004/0073761 A1* | 4/2004 | Kato | G06F 9/4403 711/165 |
| 2004/0133717 A1* | 7/2004 | Tashiro | G06F 3/0607 710/72 |
| 2004/0243858 A1* | 12/2004 | Dennis | G06F 1/3203 713/300 |
| 2005/0144364 A1* | 6/2005 | Tu | G06F 9/44521 711/103 |
| 2005/0160217 A1* | 7/2005 | Gonzalez | G06F 11/1068 711/6 |
| 2005/0283598 A1* | 12/2005 | Gaskins | G06F 9/4403 713/2 |
| 2006/0010313 A1* | 1/2006 | Chu | G06F 13/1694 713/1 |
| 2006/0095615 A1 | 5/2006 | Kim et al. | |
| 2006/0112252 A1 | 5/2006 | Dixon | |
| 2006/0259718 A1 | 11/2006 | Paley | |
| 2006/0282644 A1 | 12/2006 | Wong | |
| 2007/0005883 A1* | 1/2007 | Trika | G06F 9/4418 711/113 |
| 2007/0005952 A1* | 1/2007 | Ho | G06F 9/4401 713/2 |
| 2007/0055854 A1* | 3/2007 | Chang | G11C 16/20 713/1 |
| 2007/0124573 A1* | 5/2007 | Walker | G06F 9/4418 713/2 |
| 2007/0157045 A1* | 7/2007 | Gu | G06F 9/4418 713/323 |
| 2008/0082736 A1 | 4/2008 | Chow et al. | |
| 2008/0155287 A1* | 6/2008 | Sundaram | G11C 16/30 713/322 |
| 2008/0177937 A1 | 7/2008 | Nishihara et al. | |
| 2008/0189485 A1 | 8/2008 | Jung et al. | |
| 2009/0043963 A1* | 2/2009 | Lahcanski | G06F 17/30067 711/115 |
| 2009/0113121 A1 | 4/2009 | Lee et al. | |
| 2009/0158023 A1* | 6/2009 | Kern | G06F 9/4401 713/2 |
| 2009/0182962 A1* | 7/2009 | Khmelnitsky | G06F 13/4239 711/162 |
| 2009/0249055 A1* | 10/2009 | Itoh | G06F 9/4401 713/2 |
| 2009/0313417 A1 | 12/2009 | Wan | |
| 2009/0327589 A1 | 12/2009 | Moshayedi | |
| 2010/0058087 A1* | 3/2010 | Borras | G06F 1/3203 713/322 |
| 2010/0064126 A1* | 3/2010 | Yi | G06F 9/4418 713/2 |
| 2010/0106886 A1* | 4/2010 | Marcu | G06F 1/3225 711/102 |
| 2010/0312947 A1 | 12/2010 | Luukkainen et al. | |
| 2011/0067118 A1* | 3/2011 | Yu | G06F 21/78 726/32 |
| 2011/0125933 A1* | 5/2011 | Kobayashi | G06F 9/4411 710/13 |
| 2011/0131399 A1* | 6/2011 | Sainath | G06F 11/106 713/2 |
| 2011/0252225 A1* | 10/2011 | Liu | G06F 9/4418 713/2 |
| 2011/0271040 A1* | 11/2011 | Kamizono | G11C 16/10 711/103 |
| 2012/0023319 A1* | 1/2012 | Chin | G06F 9/4418 713/2 |
| 2012/0096256 A1* | 4/2012 | Kim | G06F 9/4418 713/2 |
| 2012/0144178 A1* | 6/2012 | Iyigun | G06F 9/4418 713/2 |
| 2012/0221843 A1* | 8/2012 | Bak | G06F 9/4418 713/100 |
| 2012/0226927 A1* | 9/2012 | Kagan | G06F 1/3203 713/323 |
| 2012/0246431 A1* | 9/2012 | Amemura | G06F 21/81 711/163 |
| 2014/0075169 A1* | 3/2014 | Andrews | G06F 9/4416 713/2 |
| 2014/0095827 A1* | 4/2014 | Wei | G06F 12/0246 711/203 |
| 2014/0200860 A1* | 7/2014 | Jun | G06F 9/4418 703/1 |
| 2014/0250295 A1* | 9/2014 | Briden | G06F 12/0246 713/2 |
| 2014/0325197 A1* | 10/2014 | Lewis | G06F 9/4418 713/2 |
| 2014/0331033 A1* | 11/2014 | Liang | G06F 12/00 713/1 |
| 2014/0337560 A1* | 11/2014 | Chun | G06F 12/0246 711/103 |
| 2015/0186151 A1* | 7/2015 | Shen | G06F 9/4418 713/2 |
| 2015/0277930 A1* | 10/2015 | Sarangdhar | G06F 21/575 713/2 |
| 2015/0331624 A1* | 11/2015 | Law | G06F 12/10 711/103 |
| 2016/0018998 A1* | 1/2016 | Mohan | G06F 3/0659 711/103 |
| 2016/0026406 A1* | 1/2016 | Hahn | G06F 3/0631 711/103 |
| 2016/0034211 A1* | 2/2016 | Minamimoto | G06F 3/0619 711/103 |
| 2016/0371096 A1* | 12/2016 | Lin | G06F 9/4406 |

* cited by examiner

RUNTIME DATA STORAGE AND/OR RETRIEVAL

FIELD OF THE DISCLOSURE

The present disclosure is generally related to storing and retrieving runtime data of a storage device.

BACKGROUND

Storage devices, such as solid state drives (SSDs), may include a controller, a non-volatile memory and a volatile memory. The storage device may be interfaced with a device, such as a host device or an accessing device. The controller may generate or use runtime data during operation. The runtime data may be stored at the non-volatile memory when the storage device (e.g., the volatile memory of the storage device) is powered down.

When returning to an active state after powering down, the runtime data may be accessed and loaded from the non-volatile memory to the volatile memory. However, loading the runtime data from the non-volatile memory may cause delays in the transition from the powered down state to the active state.

SUMMARY

A data storage device includes a non-volatile memory and a controller coupled to the non-volatile memory. The controller is configured to, in response to a transition from a low power state to an active state, load runtime data to a volatile memory of the controller from a memory of a device coupled to the controller via an interface and to, concurrently with loading the runtime data from the memory of the device to the volatile memory of the controller, load other data from the non-volatile memory to the volatile memory of the controller.

A data storage device includes a non-volatile memory and a controller coupled to the non-volatile memory. The controller is configured to, in response to an indication of a low power event, determine whether to store runtime data at a memory of a device that is coupled to the controller via an interface. The controller is further configured to, based on a determination to store the runtime data at the memory of the device, store data at the non-volatile memory, the data indicating that the runtime data is stored at the memory of the device.

A method includes performing operations at a data storage device including a non-volatile memory and a controller coupled to the non-volatile memory. The operations include determining, responsive to transitioning from a lower power state to an active state, loading runtime data from to a volatile memory of the controller from a memory of a device coupled to the controller via an interface and concurrently loading other data from the non-volatile memory to the volatile memory of the controller.

DETAILED DESCRIPTION

Particular aspects of the disclosure are described below with reference to the drawings. In the description, common features are designated by common reference numbers. As used herein, "examplary" may indicate an example, an implementation, and/or an aspect, and should not be construed as limiting or as indicating a preference or a preferred implementation.

Figure 1A:
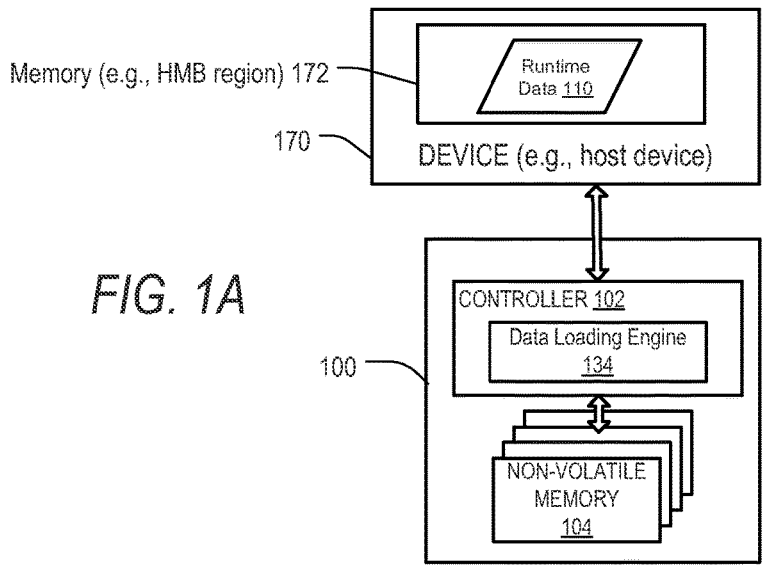
FIG. 1A is a block diagram of a particular illustrative embodiment of a non-volatile memory system.
Figure 1B:
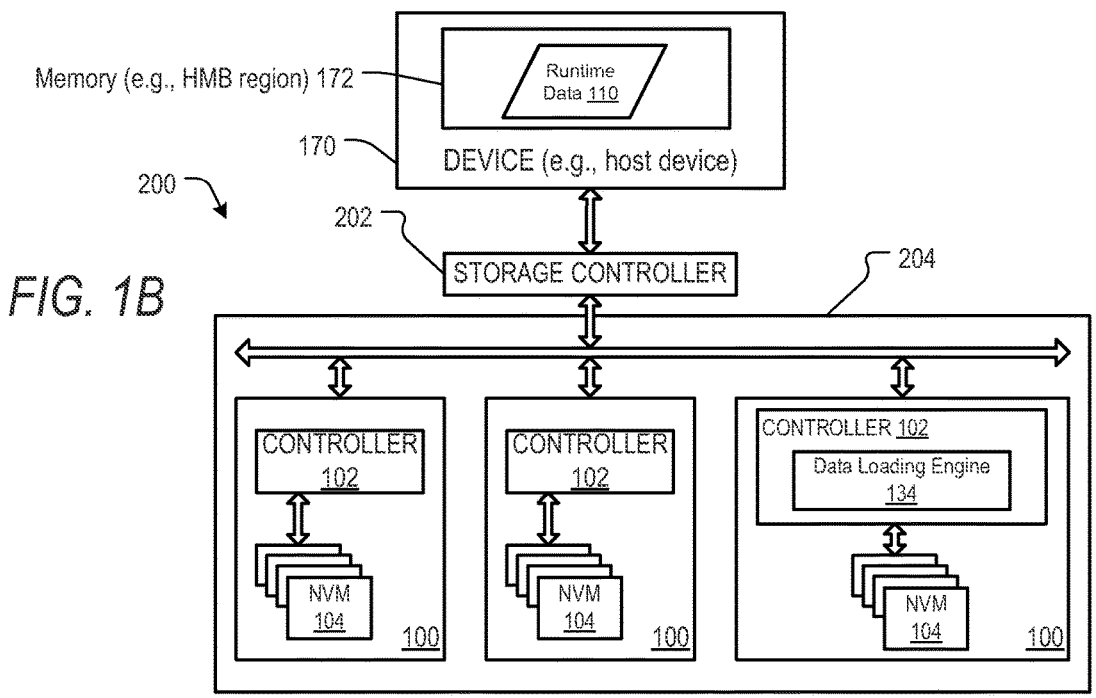
FIG. 1B is a block diagram of a particular illustrative embodiment of a storage module including a plurality of the non-volatile memory systems of FIG. 1A.
Figure 1C:
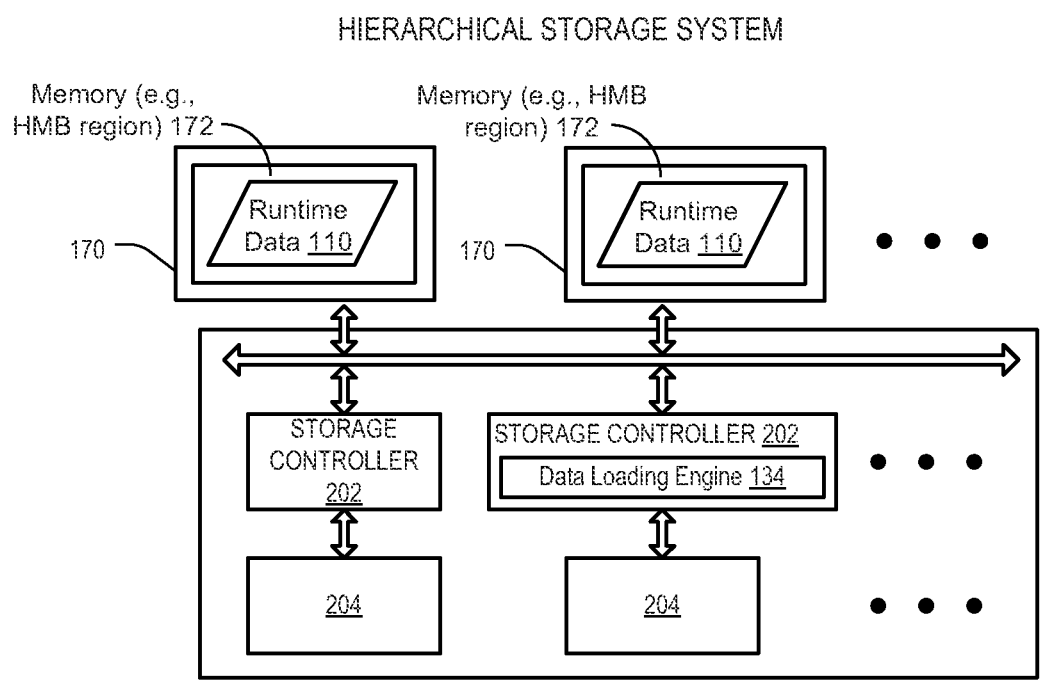
FIG. 1C is a block diagram of a particular illustrative embodiment of a hierarchical storage system.

Memory systems suitable for use in implementing aspects of the disclosure are shown in FIGS. 1A-1C. FIG. 1A is a block diagram illustrating a non-volatile memory system according to an example of the subject matter described herein. Referring to FIG. 1A, a non-volatile memory system 100 coupled to a device 170 (e.g., a host device that includes a memory 172). The non-volatile memory system 100 includes a controller 102 and non-volatile memory that may be made up of one or more non-volatile memory dies 104. As used herein, the term "memory die" refers to the collection of non-volatile memory cells, and associated circuitry for managing the physical operation of those non-volatile memory cells, that are formed on a single semiconductor substrate. The controller 102 interfaces with a host device and transmits command sequences for read, program, and erase operations to the one or more non-volatile memory dies 104. The controller 102 may include a data loading engine 134.

The controller 102 or the data loading engine 134 may be configured to determine whether to load user data, parity data, or runtime data (e.g., runtime data 110) from the non-volatile memory system 100 (e.g., from one or more of the non-volatile memory dies 104) to the device 170 in response to an indication of a low power event as described in more detail with reference to FIG. 3. The controller 102 or the data loading engine 134 of FIGS. 1A and 1B may additionally or alternatively be configured to load the user data, the parity data, and/or the runtime data 110 from the device 170 to the non-volatile memory system 100 as described in more detail with reference to FIG. 3. Additionally, the controller 102 or the data loading engine 134 may be configured to concurrently (with loading of the runtime data 110 from the device 170) load other data from a memory of the non-volatile memory system 100 (e.g., from the one or more non-volatile memory dies 104) to a volatile memory of the controller 102.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller 102 can be stored external to the controller 102, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory, map out bad flash memory cells, and allocate spare cells to be substituted for future failed cells. Some part of the spare cells can be used to hold firmware to operate the flash memory controller and implement other features. In operation, when a host device is to read data from or write data to the flash memory, the host device communicates with the flash memory controller. If the host device provides a logical address to which data is to be read/written, the flash memory controller can convert the logical address received from the host device to a physical address in the flash memory. (Alternatively, the host device can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The one or more non-volatile memory dies 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between the controller 102 and the one or more non-volatile memory dies 104 may be any suitable flash interface, such as Toggle Mode 200, 400, or 800. In one embodiment, the non-volatile memory system 100 may be a card based system, such as a secure digital (SD) or a micro secure digital (micro-SD) card. In an alternate embodiment, the non-volatile memory system 100 may be part of an embedded memory system.

Although, in the example illustrated in FIG. 1A, the non-volatile memory system 100 (sometimes referred to herein as a storage module) includes a single channel between the controller 102 and the one or more non-volatile memory dies 104, the subject matter described herein is not limited to having a single memory channel. For example, in some NAND memory system architectures (such as the ones shown in FIGS. 1B and 1C), 2, 4, 8 or more NAND channels may exist between the controller 102 and the NAND memory device, depending on controller capabilities. In any of the embodiments described herein, more than a single channel may exist between the controller 102 and the one or more non-volatile memory dies 104, even if a single channel is shown in the drawings.

FIG. 1B illustrates a storage module 200 that includes multiple non-volatile memory systems 100. As such, the storage module 200 may include a storage controller 202 that interfaces with a host device and with a storage system 204, which includes a plurality of non-volatile memory systems 100. The interface between the storage controller 202 and the non-volatile memory systems 100 may be a bus interface, such as a serial advanced technology attachment (SATA) or peripheral component interface express (PCIe) interface. The storage module 200 may correspond to a solid state drive (SSD), such as found in portable computing devices, such as laptop computers, and tablet computers. Each controller 102 of FIG. 1B may include an interface timing adjustment engine corresponding to the data loading engine 134. Alternatively or in addition, the storage controller 202 may include an interface timing adjustment engine corresponding to the data loading engine 134.

FIG. 1C is a block diagram illustrating a hierarchical storage system. A hierarchical storage system 250 includes a plurality of storage controllers 202, each of which controls a respective storage system 204. Host systems 252 (e.g., one or more host devices or accessing devices) may access memories within the hierarchical storage system 250 via a bus interface. In one embodiment, the bus interface may be an NVMe or fiber channel over Ethernet (FCoE) interface. In one embodiment, the hierarchical storage system 250 illustrated in FIG. 1C may be a rack mountable mass storage system that is accessible by multiple host computers, such as would be found in a data center or other location where mass storage is needed. Each storage controller 202 of FIG. 1C may include an interface timing adjustment engine corresponding to the data loading engine 134.

Figure 2A:
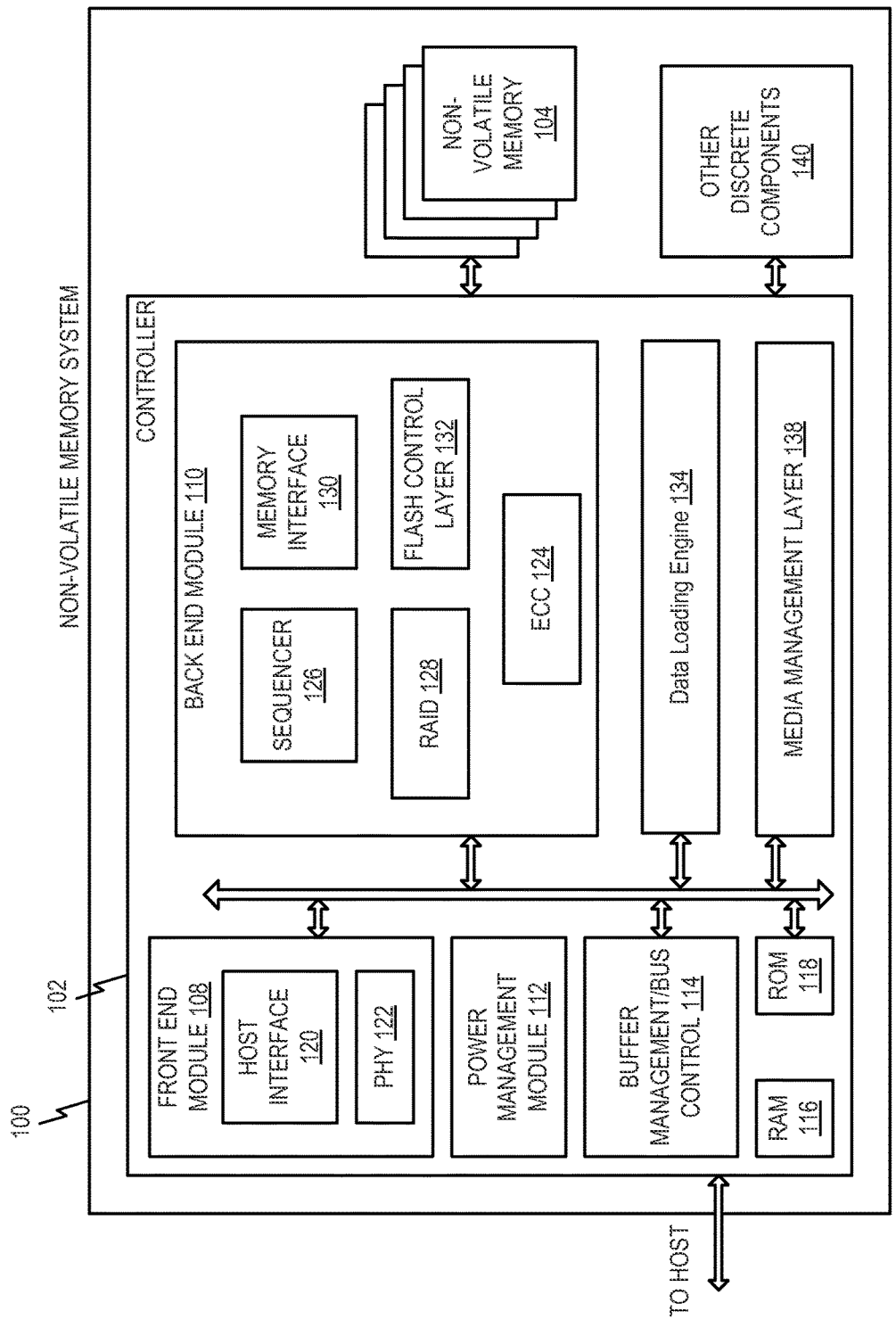
FIG. 2A is a block diagram of components of a particular illustrative embodiment of a controller.

FIG. 2A is a block diagram illustrating exemplary components of the controller 102 in more detail. The controller 102 includes a front end module 108 that interfaces with a host device, a back end module 110 that interfaces with the one or more non-volatile memory dies 104, and various other modules that perform other functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of the controller 102. A read only memory (ROM) 118 stores system boot code. Although illustrated in FIG. 2A as located within the controller 102, in other embodiments one or both of the RAM 116 and the ROM 118 may be located externally to the controller 102. In yet other embodiments, portions of RAM and ROM may be located both within the controller 102 and outside the controller 102.

Front end module 108 includes a host interface 120 and a physical layer interface (PHY) 122 that provide the electrical interface with the host device or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction code (ECC) engine 124 that encodes the data received from the host device, and decodes and error corrects the data read from the non-volatile memory. A command sequencer 126 generates command sequences, such as program and erase command sequences, to be transmitted to the one or more non-volatile memory dies 104. A RAID (Redundant Array of Independent Drives) module 128 manages generation of RAID parity and recovery of failed data. The RAID parity may be used as an additional level of integrity protection for the data being written into the one or more non-volatile memory dies 104. In some cases, the RAID module 128 may be a part of the ECC engine 124. A memory interface 130 provides the command sequences to non-volatile memory die 104 and receives status information from the one or more non-volatile memory dies 104. For example, the memory interface 130 may be a double data rate (DDR) interface, such as a Toggle Mode 200, 400, or 800 interface. A flash control layer 132 controls the overall operation of back end module 110. The back end module 110 may also include the data loading engine 134.

Additional components of the system 100 illustrated in FIG. 2A include a power management module 112 and a media management layer 138, which performs wear leveling of memory cells of the one or more non-volatile memory dies 104. System 100 also includes other discrete components 140, such as external electrical interfaces, external RAM, resistors, capacitors, or other components that may interface with the controller 102. In alternative embodiments, one or more of the physical layer interface 122, RAID module 128, media management layer 138 and buffer management/bus controller 114 are optional components that are omitted from the controller 102.

Figure 2B:
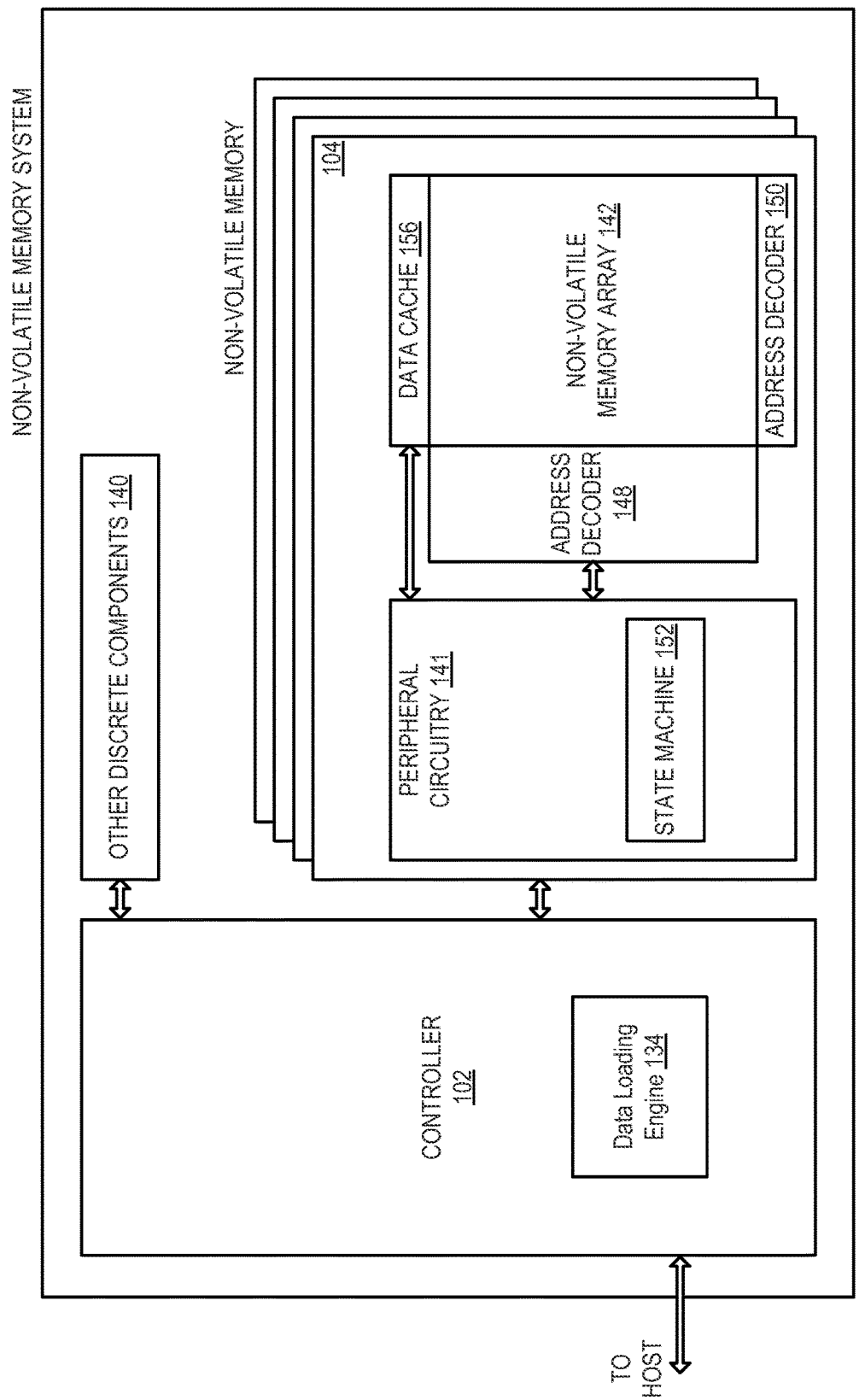
FIG. 2B is a block diagram of components of a particular illustrative embodiment of a non-volatile memory die.

FIG. 2B is a block diagram illustrating exemplary components of the one or more non-volatile memory dies 104 in more detail. The one or more non-volatile memory dies 104 include peripheral circuitry 141 and a non-volatile memory array 142. The non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. The peripheral circuitry 141 includes a state machine 152 that provides status information to the controller 102, which may include the data loading engine 134. The peripheral circuitry 141 may also include a power management or data latch control module 154. The one or more non-volatile memory dies 104 further include discrete components 140, an address decoder 148, an address decoder 150, and a data cache 156 that caches data.

Figure 3:
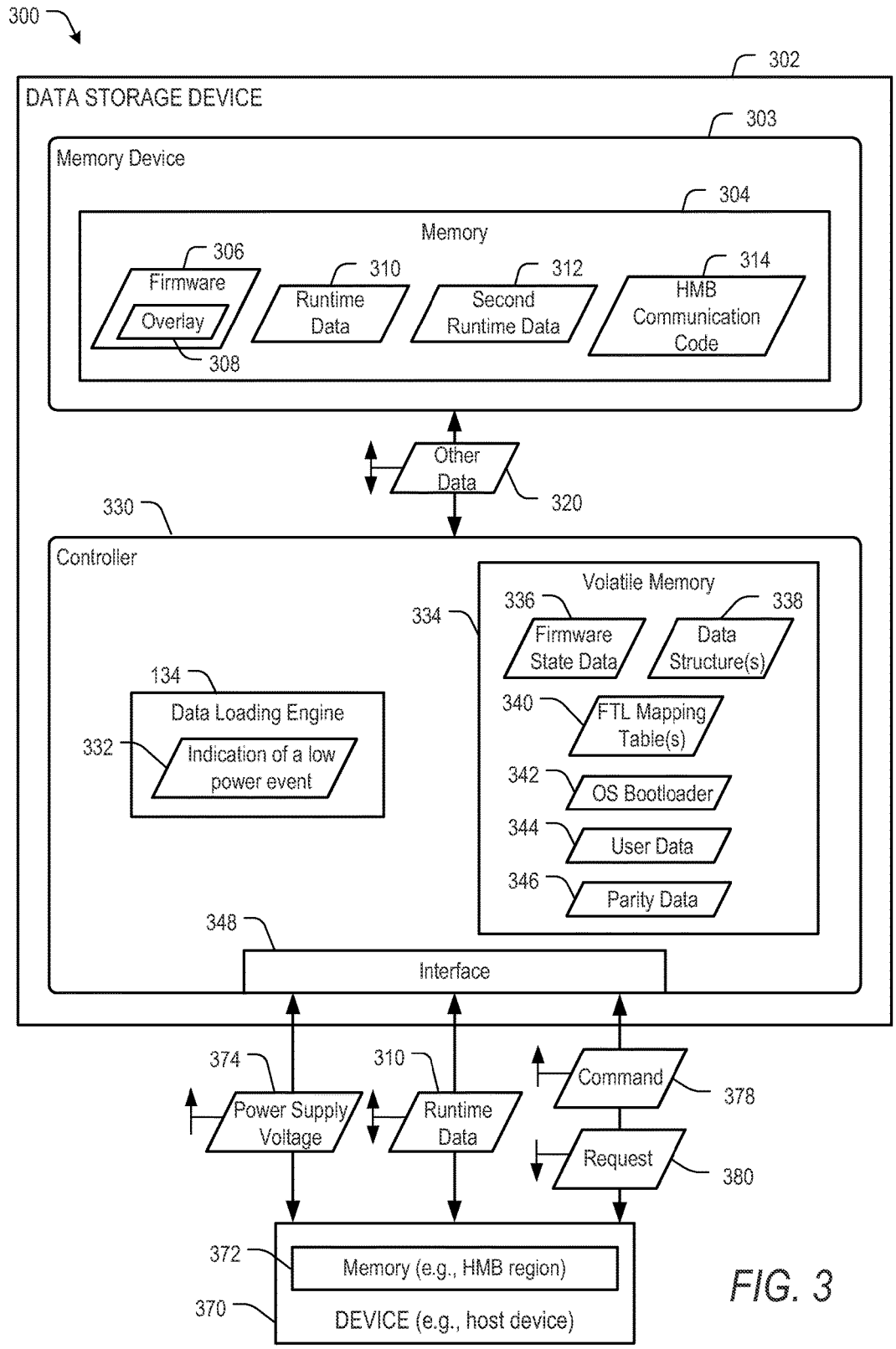
FIG. 3 is a diagram of a particular illustrative example of a system that includes a data storage device coupled to a device.

Referring to FIG. 3, a particular illustrative example of a system is depicted and generally designated 300. The system 300 includes a data storage device 302 and a device 370 (e.g., a host device or an accessing device). In some examples, the data storage device 302 may include or correspond to an SSD. In some examples, the SSD may be a peripheral component interconnect express (PCIe) enabled SSD.

The data storage device 302 includes a memory device 303, such as one or more memory dies. The memory device 303 includes a memory 304. For example, the memory 304 may include a flash memory or a resistive random access memory (RERAM).

The data storage device 302 may also include a controller 330 that is coupled to the memory device 303. The controller 330 may include the data loading engine 134 of FIGS. 1A, 1B, 1C, 2A, and/or 2B. The controller 330 may also include a volatile memory 334. FIG. 3 also illustrates that the data storage device 302 may include an interface 348 (such as a host interface). The interface 348 may include a SATA, a SATA Express, a SAS, a Fibre Channel, a USB, a PCIe, and/or a NVMe interface. The host interface 348 may facilitate transfer for data, control signals, timing signals, and or power transfer to and/or from the device 370 to the data storage device 302.

The data storage device 302 is coupled to the device 370 via the interface 348. The device 370 includes a memory 372. For example, the memory 372 may include or may correspond to a host memory buffer (HMB). In some examples, such as in runtime D3 (aka "RTD3"), the data storage device 302 may be powered down or off while the HMB is powered on. Thus, storing data in the HMB during RTD3 may keep the data persistent.

The HMB may be mapped to a DRAM of the device 370, thus allowing the device 370 to access data stored in the HMB quicker than accessing data stored on the data storage device 302. The HMB may be allocated for use by the controller 330. In some examples, the memory 372 (or a memory segment thereof) may be directly accessed by the data storage device 302 once the device 370 has allocated the memory 372 and has informed the data storage device 302 that the memory 372 is ready. For example, the device 370 may allocate the HMB and may inform the data storage device 302 that the HMB is ready to be accessed, at which point the HMB may be directly writable by the controller 330. The HMB may also be directly writable by the device 370.

During operation, the controller 330 and/or the memory device 303 may be configured to receive (e.g., via the interface 348) a power supply voltage 374 from the device 370. For example, the device 370 may correspond to a host device that powers the data storage device 302 using the power supply voltage 374.

The controller 330 may be configured to, in response to an indication 332 of a low power event, determine whether to store user data (or parity data associated with the user data), such as user data 344 or parity data 346, or runtime data, such as runtime data 310, at a memory 372 coupled to the data storage device 302. The low power event may include or correspond to the data storage device 302 (or one or more portions thereof, such as the controller 330) and/or the device 370 (or one or more portions thereof, such as the memory 372) operating in a low power state and/or transitioning from an active state (e.g., a high power state) to the low power state. In some examples, the low power state may include a power saving state (e.g., a sleep state) or may include a power off state.

In some examples, such as when the low power event includes or corresponds to the data storage device 302 (or a portion thereof) operating in, or transitioning to, the power saving state, the low power event may be performed based on an activity level associated with the controller 330 (e.g., with the memory 304). For example, the low power event may include or may correspond to the data storage device 302 (or a portion thereof) operating in, or transitioning to, the power saving state when requests are not being received from the device 370 and/or when operations are not being performed or are not scheduled to be performed at the memory 304. In these examples, the controller 330 may be configured to initiate the low power event (e.g., may initiate transition to the power saving state) and may generate the indication 332 of the low power event. Additionally or alternatively, in some examples, such as when the low power event includes or corresponds to the device 370 operating in, or transitioning to, a power off state (e.g., when power is being interrupted at the device 370), the device 370 may be configured to initiate the low power event (e.g., may initiate transition to the power off state) and may generate the indication 332 of the low power event. Thus, the indication 332 may be generated by the controller 330 (e.g., if the controller 330 is to initiate a power saving event), or the indication 332 may be generated by the device 370 and received by the controller 330 from the device 370 (e.g., if the device 370 is to initiate a power down event).

The user data 344 may correspond to cached user data that is stored in the volatile memory 334 prior to the low power event. In this case, the controller 330 may, depending on whether the controller 330 determines to store the user data 344 and/or the parity data 346 to the memory 372, relocate (e.g., flush) the user data 344 and/or the parity data 346 from the volatile memory 334 to either the memory 304 or to the memory 372 to avoid loss of the user data 344 and/or the parity data 346 during the low power event. Storing the user data 344 to the HMB instead of the memory 304 may increase endurance of the memory 304. Also, as described above, the HMB may be directly readable and/or directly writable by the device 370, and the device 370 may be able to read data from the HMB more quickly than the HMB is able to read the data from the memory 304. Thus, storing the user data 344 at the HMB may increase endurance of the memory 304 and may enable quicker access to the user data 344 stored at the HMB as compared to data stored at the memory 304.

The runtime data 310 may be associated with the controller 330 and/or operation of the memory 304. For example, the runtime data 310 may correspond to information, data structures, software, firmware, or code used by the controller 330 to initiate read and/or write requests to and/or from the memory 304.

In some examples, the runtime data 310 may correspond to one or more data structures 338. The data structures 338 may be stored in the volatile memory 334 of the controller 330 prior to the low power event. In this case, depending on whether the controller 330 determines to store the runtime data 310 to the memory 372, the controller 330 may relocate the one or more data structures 338 from the volatile memory 334 to either the memory 304 or to the memory 372 to avoid loss of the one or more data structures 338 during the low power event.

The runtime data 310 may include firmware 306. The firmware 306 may include or may correspond to firmware associated with the controller 330. For example, the firmware 306 may include or may correspond to operating software of the data storage device 302 that enables the controller 330 to interact with the memory 304 and/or with the HMB. The firmware 306 may be stored in the volatile memory 334 prior to the low power event. In this case, when the runtime data 310 includes the firmware 306, the controller 330 may, (e.g., depending on whether the controller 330 determines to store the runtime data 310 to the memory 372), store the firmware 306 (or a firmware image of the firmware 306) from the volatile memory 334 to either the memory 304 or to the memory 372 to avoid loss of the firmware 306 during the low power event.

The runtime data 310 may include one or more flash translation layer (FTL) mapping tables (or FTL mapping table updates) 340, a firmware overlay 308, and/or firmware state data 336. The FTL mapping tables (or FTL mapping table updates) 340 may correspond to tables used by the data storage device 302 to perform virtual to physical address translation. The firmware overlay 308 may correspond to a program segment called into memory (e.g., the memory 334) when required by an overlay manager. Each overlay called may overwrite an existing overlay in memory. The firmware state data 336 may correspond to data describing a state of the firmware 306. In some examples, the FTL mapping tables (or FTL mapping table updates) 340, the firmware overlay 308, the firmware state data 336, or one or more portions or combinations thereof, may be stored in the volatile memory 334 or in the memory 372 prior to the low power event (e.g., receiving the indication 332 of the low power event). When the runtime data 310 includes the FTL mapping tables (or FTL mapping table updates) 340, the firmware overlay 308, the firmware state data 336, or one or more portions or combinations thereof, stored in the volatile memory 334 prior to the low power event, the controller 330 may, depending on whether the controller 330 determines to store the runtime data 310 to the memory 372, store the FTL mapping tables (or FTL mapping table updates) 340, the firmware 306, the firmware overlay 308, the firmware state data 336, or the one or more portions or combinations thereof, from the volatile memory 334 to either the memory 304 or the memory 372.

In some examples, the controller 330 (e.g., the data loading engine 134) may be configured to determine whether to store the user data 344, the parity data 346, and/or the runtime data 310 at the memory 372 (in response to the indication 332 of a low power event) based on whether the device 370 commits to retain the user data 344, the parity data 346, and/or the runtime data 310 until after the low power event and/or based on whether the low power event includes a device power down event of the device 370. In some of these examples, the controller 330 may be configured to store the user data 344, the parity data, 346, and/or the runtime data 310 at the memory 304 when the controller 330 determines not to store the runtime data 310 at the memory 372.

To illustrate, in some cases, the controller 330 may be configured to send a request 380 to the device 370 in response to the indication 332 of the low power event to determine whether the device 370 will commit to retaining the user data 344, the parity data 346, and/or the runtime data 310 until after the low power event if the user data 344, the parity data 346, and/or the runtime data 310 is stored at the memory 372 during the low power event. The request 380 may request the device 370 to commit to retain the user data 344, the parity data 346, and/or the runtime data 310 until after the controller 330 returns to an active state after performing a low power event.

In response to receiving the request 380, the device 370 may determine whether to commit to retain the user data 344, the parity data 346, and/or the runtime data 310 until after the low power event. For example, the device 370 may commit to retain the user data 344, the parity data 346, and/or the runtime data 310 until after the low power event when the low power event does not include a power down of the device 370 or when the HMB includes non-volatile memory. Alternatively or additionally, the device 370 may not commit to retain the user data 344, the parity data 346, and/or the runtime data 310 until after the low power event when the low power event includes a power down of the device 370 and the HMB includes volatile memory.

The device 370 may inform the controller 330 whether the device 370 commits to retain the user data 344, the parity data 346, and/or the runtime data 310 until after the low power event. In some examples, the device 370 may provide a signal [not illustrated] indicating whether the device 370 commits to retain the user data 344, the parity data 346, and/or the runtime data 310 after the low power event.

The controller 330 (e.g., the data loading engine 134) may determine to store the user data 344, the parity data 346, and/or the runtime data 310 at the memory 372 if the device 370 commits to retain the user data 344, the parity data 346, and/or the runtime data 310 after the low power event, and the controller 330 may determine not to store the user data 344, the parity data 346, and/or the runtime data 310 at the memory 372 if the device 370 does not commit to retain the user data 344, the parity data 346, and/or the runtime data 310 after the low power event. For example, the controller 330 may determine to store the user data 344, the parity data 346, and/or the runtime data 310 at the memory 372 when the signal [not illustrated] provided by the device 370 indicates that the device 370 commits to retain the user data 344, the parity data 346, and/or the runtime data 310. Alternatively or in addition, the controller 330 (e.g., the data loading engine 134) may determine not to store the user data 344, the parity data 346, and/or the runtime data 310 at the memory 372 if the signal [not illustrated] provided by the device 370 indicates that the device 370 does not commit to retain the user data 344, the parity data 346, and/or the runtime data 310. Thus, the controller 330 may determine to store the user data 344, the parity data 346, and/or the runtime data 310 at the memory 372 based on whether the device 370 commits to retain the user data 344, the parity data 346, and/or the runtime data 310 after the low power event.

In some examples, the controller 330 may determine to store the user data 344, the parity data 346, and/or the runtime data 310 at the memory 372 if the device 370 commits to retain the user data 344, the parity data 346, and/or the runtime data 310 after the low power event, and may determine to store the user data 344, the parity data 346, and/or the runtime data 310 at the memory 304 if the device 370 does not commit to retain the user data 344, the parity data 346, and/or the runtime data 310. For example, the controller 330 may determine to store the user data 344, the parity data 346, and/or the runtime data 310 at the memory 372 when the signal [not illustrated] provided by the device 370 indicates that the device 370 commits to retain the user data 344, the parity data 346, and/or the runtime data 310 and the controller 330 may determine to store the user data 344, the parity data 346, and/or the runtime data 310 at the memory 304 if the signal [not illustrated] provided by the device 370 indicates that the device 370 does not commit to retain the user data 344, the parity data 346, and/or the runtime data 310. Thus, the controller 330 may determine to store the user data 344, the parity data 346, and/or the runtime data 310 at the memory 372 or at the memory 304 based on whether the device 370 commits to retain the user data 344, the parity data 346, and/or the runtime data 310 after the low power event.

As another example, the controller 330 (e.g., the data loading engine 134) may be configured to determine whether the low power event includes a device power down event of the device 370. For example, the controller 330 may receive a message (e.g., including an op code) from the device 370 informing the controller 330 that the device 370 is going to power down. In some examples, the message informing the controller 330 of the device power down event may be included in or correspond to the indication 332 or the message may accompany the indication 332. If the low power event includes a device power down event of the device 370, the controller 330 (e.g., the data loading engine 134) may determine to store the user data 344, the parity data 346, and/or the runtime data 310 at the memory 304. Alternatively or additionally, if the low power event does not include a device power down event of the device 370, the controller 330 (e.g., the data loading engine 134) may determine to store the user data 344, the parity data 346, and/or the runtime data 310 at the memory 372 of the device 370.

In some cases, the controller 330 may be configured to store the runtime data 310 at the memory 372 to expedite a transition from a low power state to an active state as described in more detail below. For example, the controller 330 may be configured to send firmware 306 to the device 370 to be stored at the memory 372 (and to be retrieved after the transition from the low power state to the active state). To further illustrate, the controller 330 may be configured to send a firmware overlay 308 to the device 370 to be stored at the memory 372.

Based on a determination to store the runtime data 310 at the memory 372, the controller 330 may store host memory buffer communication code 314 at the memory 304 or at the controller 330. The host memory buffer communication code 314 may indicate that the runtime data 310 is stored at the memory 372.

The controller 330 may be configured to track available storage space of the HMB. For example, the device 370 may inform the controller 330 of the amount of storage initially allocated to the HMB, and the controller 330 may store the initial size of the HMB. The controller 330 may also track an amount of data that the controller 330 writes to the HMB. Additionally or alternatively, as described above, the HMB may be directly writable by the device 370, and the device 370 may inform the controller 330 of the amount of data written to the HMB by the device 370. The controller 330 may determine an amount of available space of the HMB based on the initial amount of storage space allocated to the HMB, based on the amount of data stored by the controller 330 in the HMB, and based on the amount of data stored by the device 330 in the HMB (e.g., the available space of the HMB may correspond to the initial storage size minus the amount of data stored in the HMB by the controller 330 and/or by the device 370). In some implementations, for example when the amount of available storage space of the HMB satisfies (e.g., is less than) a threshold, the controller 330 may be configured to request an increase in a size of a portion of the memory 372 allocated for use by the controller 330 (e.g., a size of the HMB). For example, based on a determination to store the user data 344, the parity data 346, and/or the runtime data 310 at the memory 372, the controller 330 may be configured to request an increase in a size of a portion of the memory 372 allocated to the controller 330. To illustrate, the controller 330 may request a size increase if the size of the portion of the memory 372 allocated to the controller 330 is less than a data size of the user data 344, the parity data 346, and/or the runtime data 310.

After initiation of the low power state, the controller 330 may be configured to transition from the low power state to the active state. In some examples, such as when the low power state corresponds to a sleep state, the transition from the low power state to the active state may be responsive to a command 378 from the device 370. The command 378 may command the data storage device 302 to transition from the sleep state to the active state. In other examples, such as when the low power state corresponds to a power off state, the transition from the low power state to the active state may be responsive to a boot up of the device 370.

In response to the transition, the controller 330 (e.g., the data loading engine 134) may be configured to determine whether the user data 344, the parity data 346, and/or the runtime data 310 is stored at the memory 372. For example, the controller 330 (e.g., the data loading engine 134) may be configured to access the host memory buffer communication code 314 (e.g., from the memory 304) to determine whether the user data 344, the parity data 346, and/or the runtime data 310 is stored at the memory 372. The controller 330 may be configured to load the host memory buffer communication code 314 from the memory 304. The host memory buffer communication code may be executable by the controller 330 to determine whether the user data 344, the parity data 346, and/or the runtime data 310 is stored at the memory 372 of the device 370.

Based on a determination that the user data 344, the parity data 346, and/or the runtime data 310 is stored at the memory 372, the controller 330 may load the user data 344, the parity data 346, and/or the runtime data 310 from the memory 372. In some implementations, the controller 330 may, concurrently with loading the user data 344, the parity data 346, and/or the runtime data 310 from the memory 372, load other data 320 from the memory 304 to the volatile memory 334.

In some examples, such as when the runtime data 310 includes the firmware 306 (or a portion thereof) or the firmware overlay 308 and the controller 330 determines that the runtime data 310 is stored at the memory 372, the controller 330 may load firmware (e.g., from the memory 304 to the memory 334) to communicate with the HMB (e.g., "HMB communication firmware"), execute the HMB communication firmware, initialize HMB communication related blocks (e.g., on a frontend), notify the device 370 that controller 330 is ready for communication with the HMB, and load the runtime data 310 (including the firmware 306 and/or the firmware overlay 308) from the HMB to the memory 304 or the memory 334. The controller 330 may execute the firmware 306 and/or the firmware overlay 308 to complete initialization of the controller 330. Thus, data, such as the firmware 306 or the firmware overlay 308, stored at the HMB may be used to initialize the controller 330.

In some examples, the runtime data 310 may be loaded from the HMB to the memory 334 concurrently with other data. To illustrate, in some cases, the runtime data 310 stored at the memory 372 (e.g., the HMB) may include the firmware overlay 308 and the other data 320 may include portions (e.g., other portions) of the firmware 306. Alternatively, or in addition, the other data 320 may include second runtime data 312. Loading the runtime data 310 from the memory 372 after HMB communication between the controller 330 and the device 372 has been enabled, and concurrently with loading the other data 320 from the memory 304, may reduce a startup time of the data storage device 302 as compared to loading both the runtime data 310 and the other data 320 from the memory 304.

The controller 330 may be further configured to load at least a portion of an operating system bootloader 342 from the non-volatile memory 304 to the memory 372. For example, when the transition from the low power state to the active state corresponds to a device power on event of the device 370, the controller 330 may load at least a portion of the operating system bootloader 342 to the memory 372 of the device 370. Thus, in this example, the HMB may be created and initialized before loading the operating system bootloader 342 to the device 372, allowing the device 372 to read and/or load the operating system bootloader 342 using the HMB.

The examples described with reference to FIG. 3 may enable improved performance at the data storage device 302. For example, by loading the runtime data 310 from the memory 372 concurrently with loading the other data 320 from the memory 304, a startup time of the data storage device 302 may be reduced as compared to loading both the runtime data 310 and the other data 320 from the memory 304. As another example, using the memory 372 to store the runtime data 310 (instead of storing the runtime data 310 at the memory 304) may free storage space of the memory 304 to store other data, such as user data.

Figure 4:
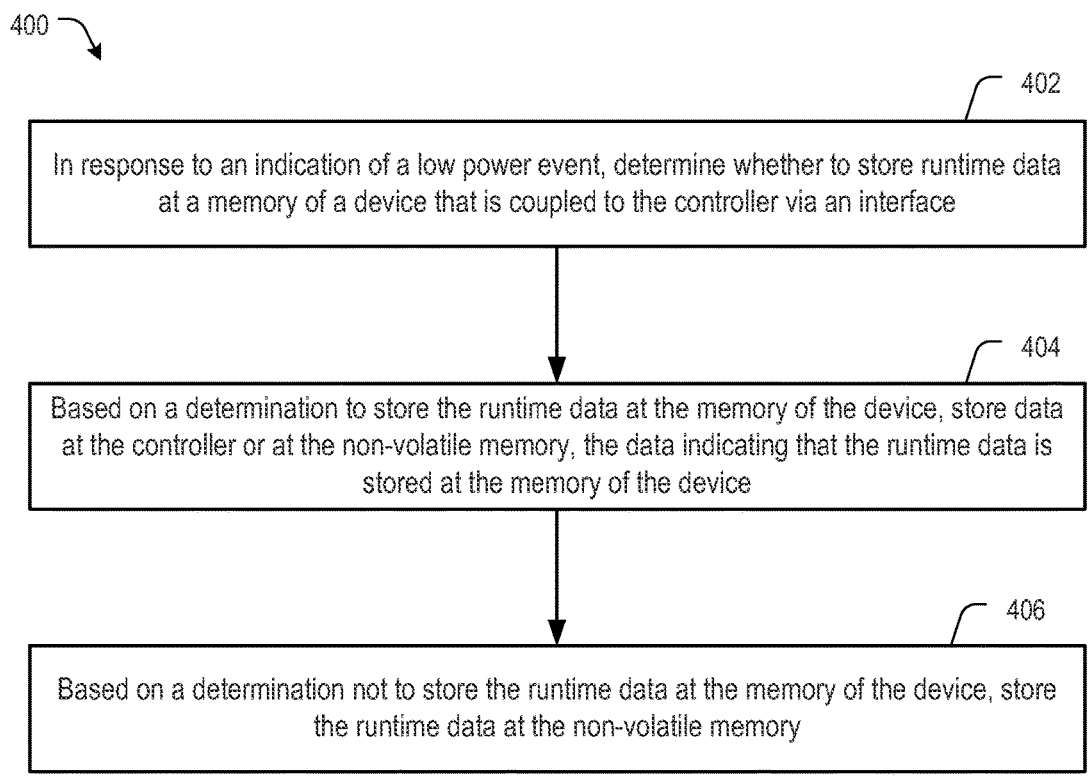
FIG. 4 is a flow chart of a particular illustrative embodiment of a method of storing runtime data.

Referring to FIG. 4, a particular illustrative example of a method is depicted and generally designated 400. The method 400 may be performed at a data storage device, such as at the data storage device 302 of FIG. 3.

The method 400 may include determining, in response to an indication of a power down event, whether to store user data, parity data, and/or runtime data associated with a controller of the data storage device at a memory of a device that is coupled to the controller via an interface, at 402. The runtime data is associated with operation of a non-volatile memory of the data storage device. To illustrate, the indication may correspond to the indication 332 of FIG. 3, the user data may correspond to the user data 344, the parity data may correspond to the parity data 346, and the runtime data may correspond to the runtime data 310. The controller may correspond to the controller 330, the device may correspond to the device 370, and the memory may correspond to the memory 372. As additional examples, the interface may correspond to the interface 348 and the non-volatile memory may correspond to the memory 304. The determination of whether to store the user data 344, the parity data 346, and/or the runtime data to the memory of the device that is coupled to the controller may be made based on whether the device that is coupled to the controller commits to retain the user data, the parity data, and/or the runtime data and/or based on whether the low power event includes a power down event for the device that is coupled to the controller, as described above with reference to FIG. 3.

The method 400 further includes storing data at the controller or at the non-volatile memory based on a determination to store the user data, the parity data, and/or the runtime data at the memory of the device, at 404. For example, the data may indicate whether the user data 344, the parity data 346, and/or the runtime data 310 of FIG. 3 is stored at the memory 372. To illustrate, the data may correspond to the host memory buffer communication code 314 and the host memory buffer communication code 314 may be stored at the controller 330 or at the memory 304 when the user data 344, the parity data 346, and/or the runtime data 310 is to be stored at the memory 372. The data (e.g., the host memory buffer communication code 314) may enable the controller 330 to determine, upon transitioning to the active state, where the user data 344, the parity data 346, and/or the runtime data 310 is stored and whether to establish HMB communication between the controller 330 and the device 370 before loading the user data 344, the parity data 346, and/or the runtime data 310 to the controller 330 (e.g., to the memory 334).

The method 400 of FIG. 4 further includes storing the user data, the parity data, and/or the runtime data at the non-volatile memory based on a determination not to store the user data, the parity data, and/or the runtime data at the memory of the device, at 406. For example, if the controller 330 of FIG. 3 determines not to store the user data 344, the parity data 346, and/or the runtime data 310 at the memory 372 (e.g., for reasons related to availability of the runtime data 310 after the low power event if stored at the memory 372 during the low power event), the controller 330 may store the user data 344, the parity data 346, and/or the runtime data 310 at the memory 304. Thus, the user data 344, the parity data 346, and/or the runtime data 310 may be stored at the memory 372 during the low power event when doing so results in the user data 344, the parity data 346, and/or the runtime data 310 being available after the low power event. As described above, storing the runtime data 310 at the memory 372 prior to a low power event may enable parallel or concurrent loading of runtime data after the low power event, which may reduce a startup time of the data storage device 302 after the low power event as compared to loading both the runtime data 310 and the other data 320 from the memory 304 after the low power event. Thus, the method 400 may enable the controller 330 to reduce a startup time as compared to methods that do not allow for parallel or concurrent loading of runtime data after the low power event.

Figure 5:
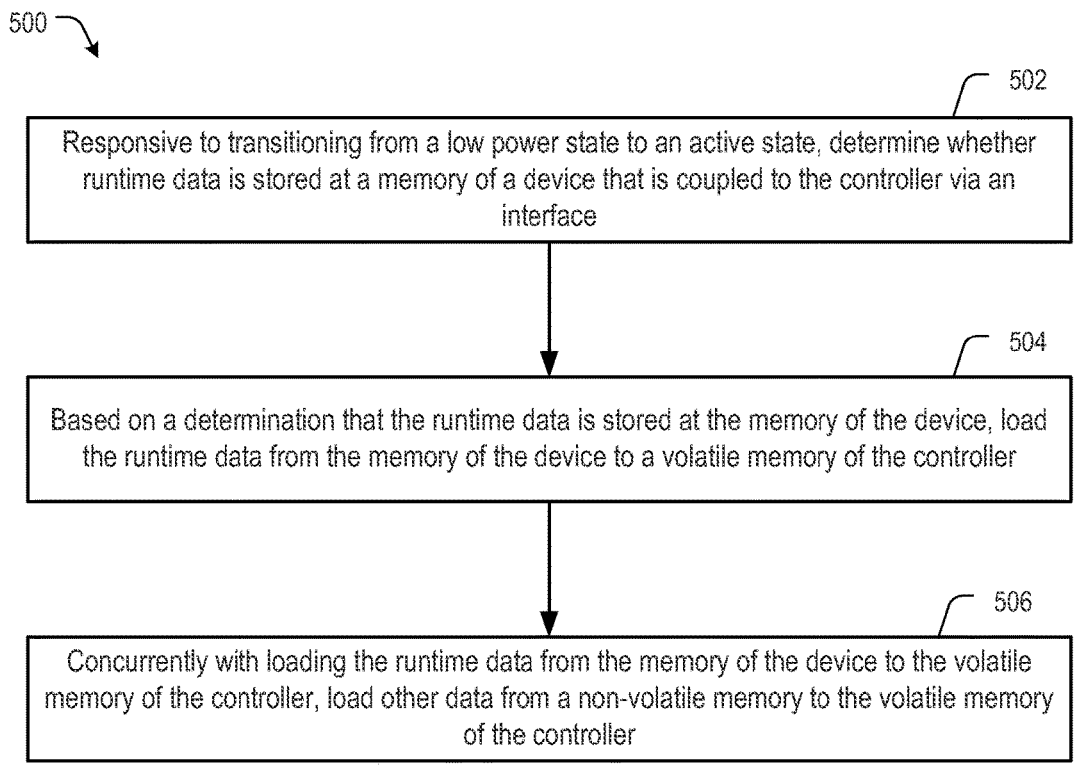
FIG. 5 is a flow chart of a particular illustrative embodiment of a method of loading runtime data.

Referring to FIG. 5, a particular illustrative example of a method is depicted and generally designated 500. The method 500 may be performed at a data storage device, such as at the data storage device 302 of FIG. 3.

The method 500 includes determining, responsive to transitioning from a low power state to an active state, whether user data, parity data, and/or runtime data associated with a controller of the data storage device is stored at a memory of a device that is coupled to a controller via an interface, at 502. For example, the user data may correspond to the user data 344 of FIG. 3, the parity data may correspond to the parity data 346, the runtime data may correspond to the runtime data 310, the controller may correspond to the controller 330, and the memory may correspond to the memory 372 of the device 370. To further illustrate, the interface may correspond to the interface 348. For example, the controller 330 may access data indicating whether the user data 344, the parity data 346, and/or the runtime data 310 is stored at the memory 372. To illustrate, the controller 330 may access and read the host memory buffer communication code 314 stored at the controller 330 or at the memory 304 to determine whether the user data 344, the parity data 346, and/or the runtime data 310 is stored at the memory 372.

The method 500 of FIG. 5 also includes loading the user data, the parity data, and/or the runtime data from the memory of the device to a volatile memory of the controller based on a determination that the user data, the parity data, and/or the runtime data is stored at the memory of the device, at 504. For example, the runtime data 310 of FIG. 3 may be loaded from the memory 372 to the volatile memory 334 based on a determination (e.g., made based on the host memory buffer communication code 314) that the runtime data 310 is stored at the memory 372. To illustrate, the runtime data 310 may include the firmware 306 (or portions thereof) and/or the firmware overlay 308, and the controller 330 may load the firmware 306 and/or the firmware overlay 308 from the HMB to the memory 334 based on the determination (e.g., made based on the host memory buffer communication code 314) that the runtime data 310 (including the firmware 306 and/or the firmware overlay 308) is stored at the memory 372.

The method 500 of FIG. 5 further includes loading other data from a non-volatile memory to the volatile memory of the controller concurrently with loading the user data, the parity data, or the runtime data from the memory of the device to the volatile memory of the controller, at 506. For example, the other data 320 of FIG. 3 may be loaded from the memory 304 to the volatile memory 334 concurrently with loading the runtime data 310 from the memory 372 to the volatile memory 334. For example, the runtime data 310 may include the firmware overlay 308 and/or portions of the firmware 306, the other data 320 may correspond to other portions of the firmware 306, and the controller 330 may concurrently load the runtime data 310 from the HMB to the memory 304 and the other data 320 from the memory 334 to the memory 304. As described above, parallel or concurrent loading of the runtime data 310 and the other data 320 after the low power event may reduce a startup time of the data storage device 302 after the low power event as compared to loading both the runtime data 310 and the other data 320 from the memory 304 after the low power event. Thus, the method 500 may enable the controller 330 to reduce a startup time as compared to methods that do not allow for parallel or concurrent loading of runtime data after the low power event.

Figure 6:
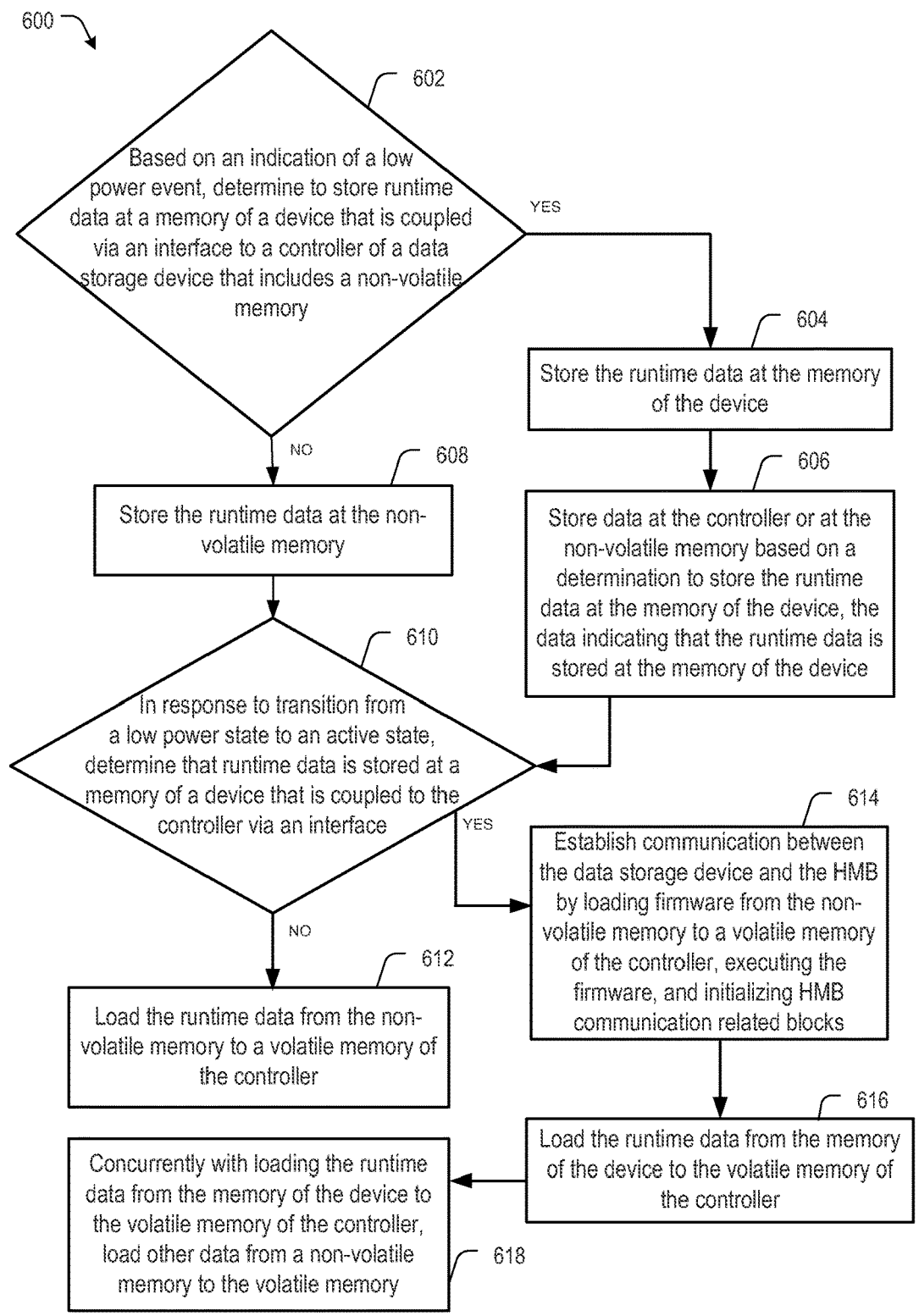
FIG. 6 is a flow chart of a particular illustrative embodiment of a method of processing data.

Referring to FIG. 6, a particular illustrative example of a method is depicted and generally designated 600. The method 600 may be performed at a data storage device, such as at the data storage device 302 of FIG. 3.

At 602, the method 600 includes, based on an indication of a low power event, determining whether to store runtime data at a memory of a device that is coupled to a controller via an interface as described above with reference to 402 of FIG. 4. The method 600 further includes, at 604, storing the user data, the parity data, and/or the runtime data at the memory of the device based on a determination to store the user data, the parity data, and/or the runtime data at the memory of the device. For example, the user data may correspond to the user data 344 of FIG. 3, the parity data may correspond to the parity data 346, and the runtime data may correspond to the runtime data 310. The controller may correspond to the controller 330, the device may correspond to the device 370, and the memory may correspond to the memory 372.

The method 600 further includes, at 606, storing data at the controller or at the non-volatile memory based on a determination to store the user data, the parity data, and/or the runtime data at the memory of the device, as described above with reference to 404 of FIG. 4. For example, the data may correspond to the host memory buffer communication code 314 of FIG. 3 and the controller 330 may store host memory buffer communication code 314 at the memory 304 or at the controller 330 based on a determination to store the runtime data 310 at the memory 372.

The method 600 further includes storing, at 608, the user data, the parity data, and/or the runtime data at the non-volatile memory based on a determination not to store the user data, the parity data, and/or the runtime data at the memory of the device as described above with reference to 406 of FIG. 4. The method 600 further includes, responsive to transitioning from a low power state to an active state, determining, at 610, whether user data, parity data, and/or runtime data is stored at a memory of a device that is coupled to a controller via an interface as described above with reference to 502 of FIG. 5. For example, in response to the transition, the controller 330 of FIG. 3 may be configured to determine whether the user data 344, the parity data 346, and/or the runtime data 310 is stored at the memory 372. To illustrate, the controller 330 (e.g., the data loading engine 134) may be configured to access the host memory buffer communication code 314 (e.g., from the memory 304) to determine whether the user data 344, the parity data 346, and/or the runtime data 310 is stored at the memory 372. The controller 330 may be configured to load the host memory buffer communication code 314 from the memory 304. The host memory buffer communication code may be executable by the controller 330 to determine whether the user data 344, the parity data 346, and/or the runtime data 310 is stored at the memory 372 of the device 370.

The method 600 further includes, when the controller determines at 610 that the runtime data is stored at the memory of the device, establishing, at 614, communication between the data storage device, e.g., the controller 330 of FIG. 3, and the HMB by loading firmware from the non-volatile memory to the volatile memory, executing the firmware, and initializing the HMB communication related blocks as described above with reference to FIG. 3. The method 600 further includes loading, at 616, the user data, the parity data, and/or the runtime data from the memory of the device to a volatile memory of the controller based on a determination that the user data, the parity data, and/or the runtime data is stored at the memory of the device as described above with reference to 504 of FIG. 5. The method 600 further includes loading, at 618, other data from a non-volatile memory to the volatile memory of the controller concurrently with loading the user data, the parity data, or the runtime data from the memory of the device to the volatile memory of the controller as described above with reference to 506 of FIG. 5.

The method 600 of FIG. 6 further includes, when the controller determines at 610 that the runtime data is not stored at the memory of the device, loading the runtime data from the non-volatile memory to the memory at 612. For example, the controller 330 of FIG. 3 may load the firmware 306 and/or the firmware overlay 308 from the non-volatile memory 304 to the volatile memory 334.

Although various components depicted herein are illustrated as block components and described in general terms, such components may include one or more microprocessors, state machines, or other circuits configured to enable the data loading engine 134 of FIGS. 1A, 1B, 1C, 2A, 2B, and/or 3 to determine where to store the runtime data 310 in response to an indication of a low power event and/or to determine where runtime data is stored in response to a transition from a low power state to an active state. For example, the data loading engine 134 may represent physical components, such as hardware controllers, state machines, logic circuits, or other structures, to enable the data loading engine 134 to determine where to store the runtime data 310 in response to an indication of a low power event and/or to determine where runtime data is stored in response to a transition from a low power state to an active state.

The data loading engine 134 may be implemented using a microprocessor or microcontroller programmed to detect an indication of a low power event and to determine whether to store user data, parity data, and/or runtime data to the memory of a data storage device or to memory of a device interfaced to the data storage device. Alternatively or in addition, the data loading engine 134 may be implemented using a microprocessor or microcontroller programmed to detect a transition from a low power state to an active state and to determine whether runtime data associated with operation of the controller is stored at a memory of a data storage device or at a memory of a device interfaced to the data storage device. In a particular embodiment, the data loading engine 134 includes a processor executing instructions (e.g., firmware) that are stored at the non-volatile memory 104. Alternatively, or in addition, executable instructions that are executed by the processor may be stored at a separate memory location that is not part of the non-volatile memory 104, such as at a read-only memory (ROM).

In a particular embodiment, the data storage device 102 may be implemented in a portable device configured to be selectively coupled to one or more external devices. However, in other embodiments, the data storage device 102 may be attached or embedded within one or more host devices, such as within a housing of a host communication device. For example, the data storage device 102 may be within a packaged apparatus such as a wireless telephone, a personal digital assistant (PDA), a gaming device or console, a portable navigation device, or other device that uses internal non-volatile memory. In a particular embodiment, the data storage device 102 may include a non-volatile memory, such as a three-dimensional (3D) memory, a flash memory (e.g., NAND, NOR, Multi-Level Cell (MLC), a Divided bit-line NOR (DINOR) memory, an AND memory, a high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data storage device comprising:
 a non-volatile memory; and
 a controller coupled to the non-volatile memory, the controller configured to, in response to a transition from a low power state to an active state, load:
  runtime data from a memory of a device that is coupled to the controller to a volatile memory of the controller during a first time period; and
  non-firmware data from the non-volatile memory to the volatile memory of the controller during a second time period, wherein the first time period and the second time period at least partially overlap.

2. The data storage device of claim 1, wherein the non-firmware data includes computer-readable code other than controller firmware.

3. The data storage device of claim 1, wherein the non-firmware data includes second runtime data or firmware associated with the controller.

4. The data storage device of claim 1, wherein the runtime data includes one or more flash translation layer (FTL) mapping tables.

5. The data storage device of claim 1, further comprising an interface configured to provide an interface with an accessing device or a next level storage controller, and wherein the runtime data includes firmware state data associated with firmware of the controller.

6. The data storage device of claim 1, wherein the controller is further configured to load the runtime data and the non-firmware data concurrently or in parallel.

7. The data storage device of claim 1, wherein the low power state comprises a sleep state, and wherein the transition from the low power state to the active state is responsive to a command from the device.

8. The data storage device of claim 1, wherein the low power state comprises a power off state, and wherein the transition from the low power state to the active state is responsive to boot up of the device.

9. The data storage device of claim 1, wherein the device includes a host device configured to provide a power supply voltage to the controller via an interface, and wherein the memory of the device corresponds to a host memory buffer of the host device allocated for use by the controller.

10. The data storage device of claim 1, wherein the controller is further configured to load a host memory buffer communication code from the non-volatile memory, and wherein the host memory buffer communication code is executable by the controller to determine whether the runtime data is stored at the memory of the device.

11. The data storage device of claim 1, wherein the runtime data is associated with operation of the non-volatile memory.

12. The data storage device of claim 1, wherein the controller is further configured to:
in response to an indication of a low power event, determine whether to store the runtime data at the memory of the device; and
based on a determination to store the runtime data at the memory of the device, store second data at the non-volatile memory, the second data indicating that the runtime data is stored at the memory of the device.

13. The data storage device of claim 12, wherein the indication of the low power event is generated by the controller, and wherein the low power event includes a power saving event initiated by the controller.

14. The data storage device of claim 12, wherein the controller is further configured to generate the indication of the low power event based on an activity level associated with the non-volatile memory.

15. The data storage device of claim 12, wherein the controller is further configured to perform the low power event by transitioning from the active state to the low power state.

16. The data storage device of claim 12, wherein the memory of the device corresponds to a host memory buffer allocated for use by the controller.

17. The data storage device of claim 12, wherein the controller is further configured to, based on a determination to store the runtime data at the memory of the device, request an increase in a size of a portion of the memory of the device allocated for use by the controller.

18. The data storage device of claim 12, wherein determining whether to store the runtime data at the memory of the device includes:
requesting the device to commit to retain the runtime data until after the controller returns to the active state after performing the low power event, wherein the controller is further configured to determine to store the runtime data at the memory of the device when the device commits to retain the runtime data, and wherein the controller is further configured to determine to store the runtime data at the non-volatile memory when the device does not commit to retain the runtime data; or
determining whether the low power event comprises a device power down event of the device, wherein the controller is further configured to determine to store the runtime data at the memory of the device when the low power event comprises the device power down event.

19. The data storage device of claim 12, wherein the controller is further configured to, in response to the indication of a low power event, determine whether to store user data, parity data, or both at the memory of the device.

20. A method comprising:
at a data storage device including a non-volatile memory and a controller coupled to the non-volatile memory, performing:
responsive to transitioning from a low power state to an active state, loading:
runtime data from a memory of a device coupled to the controller to a volatile memory of the controller during a first period; and
non-firmware data from the non-volatile memory to the volatile memory of the controller during a second time period, wherein the first time period and the second time period at least partially overlap.

21. The method of claim 20, wherein the runtime data and the non-firmware data are loaded concurrently or in parallel, and further comprising sending a firmware overlay to the device, the firmware overlay to be stored at the memory of the device.

22. The method of claim 20, wherein the device comprises a host device, and further comprising, if the transition from the low power state to the active state corresponds to a device power on event of the device, loading at least a portion of an operating system bootloader of the device from the non-volatile memory to the memory of the device.

23. The method of claim 20, further comprising determining whether the runtime data is stored at the memory of the device by loading information from the non-volatile memory.

24. The method of claim 23, wherein the information includes a host memory buffer communication code that is executable by the controller to determine whether the runtime data is stored at the memory of the device.

25. The method of claim 20, wherein the non-firmware data includes information other than controller firmware, and further comprising, based on a determination that the runtime data is not stored at the memory of the device, loading the runtime data from the non-volatile memory to the volatile memory of the controller.

26. An apparatus, comprising:
means for storing data; and
means for loading information in response to a transition from a low power state to an active state, wherein the means for loading information is configured to load:
runtime data, during a first time period, from second means for storing data that is included in means for processing data to third means for storing data that is included in means for controlling the means for storing data; and
non-firmware data, during a second time period, from the means for storing data to the third means for storing data, wherein the first time period and the second time period at least partially overlap.

27. The apparatus of claim 26, further comprising means for interfacing with the means for processing data, wherein:
the means for loading information is further configured to:
load the runtime data from the second means for storing data via the means for interfacing; and concurrently or in parallel load the non-firmware data from the means for storing data, and
the non-firmware data includes information other than controller firmware.

* * * * *